(12) United States Patent
Hozumi et al.

(10) Patent No.: US 8,251,678 B2
(45) Date of Patent: Aug. 28, 2012

(54) VACUUM PUMP UNIT

(75) Inventors: Takashi Hozumi, Tokyo (JP); Nobuhito Miyashita, Tokyo (JP); Takanori Inada, Tokyo (JP); Kozo Matake, Tokyo (JP); Yoshinori Ojima, Tokyo (JP); Susumu Miyake, Tokyo (JP); Katsuaki Usui, Tokyo (JP)

(73) Assignee: Ebara Corporation, Tokyo (JP)

( * ) Notice: Subject to any disclaimer, the term of this patent is extended or adjusted under 35 U.S.C. 154(b) by 1075 days.

(21) Appl. No.: 12/158,819

(22) PCT Filed: Jan. 29, 2007

(86) PCT No.: PCT/JP2007/051840
§ 371 (c)(1),
(2), (4) Date: Jun. 23, 2008

(87) PCT Pub. No.: WO2007/088989
PCT Pub. Date: Aug. 9, 2007

(65) Prior Publication Data
US 2009/0047142 A1 Feb. 19, 2009

(30) Foreign Application Priority Data

Jan. 31, 2006 (JP) ................................. 2006-023764
Jan. 31, 2006 (JP) ................................. 2006-023765

(51) Int. Cl.
*F04B 17/00* (2006.01)
(52) U.S. Cl. .................... 417/410.4; 417/246; 417/247; 417/205

(58) Field of Classification Search .................. 417/244, 417/246, 247, 205, 410.4
See application file for complete search history.

(56) References Cited

U.S. PATENT DOCUMENTS

| 2,721,694 | A | * | 10/1955 | Van Atta | .................... | 418/206.5 |
| 3,922,110 | A | * | 11/1975 | Huse | ................. | 417/2 |
| 5,354,179 | A | * | 10/1994 | Maruyama et al. | ............ | 417/42 |
| 5,904,473 | A | * | 5/1999 | Dahmlos et al. | .......... | 417/410.4 |
| 6,196,810 | B1 | | 3/2001 | Taniguchi et al. | | |
| 2003/0035738 | A1 | * | 2/2003 | Kim | ............................ | 417/310 |

(Continued)

FOREIGN PATENT DOCUMENTS

JP  5-240181 A  9/1993

(Continued)

OTHER PUBLICATIONS

International Search Report of PCT/JP2007/051840, date of mailing May 15, 2007.

*Primary Examiner* — Charles Freay
(74) *Attorney, Agent, or Firm* — Westerman, Hattori, Daniels & Adrian, LLP

(57) ABSTRACT

The present invention relates to a dry vacuum pump unit capable of achieving ultimate pressure of about 1 Pa. The vacuum pump unit includes a main pump (15) disposed at an outside-pressure side, and a booster pump (16) disposed at a vacuum side. The booster pump (16) and the main pump (15) are coupled in series. The booster pump (16) has a higher pumping speed than that of the main pump (15). Each of the main pump (15) and the booster pump (16) includes a pair of pump rotors (52a and 52b), a casing (50) having an inlet port and an outlet port, and a pair of magnet rotors (54 and 54) rotatable with the pair of pump rotors.

19 Claims, 13 Drawing Sheets

U.S. PATENT DOCUMENTS

| | | | |
|---|---|---|---|
| 2003/0077182 A1* | 4/2003 | Naito et al. | 417/244 |
| 2004/0173312 A1 | 9/2004 | Shibayama et al. | |
| 2004/0213686 A1* | 10/2004 | Ojima et al. | 417/410.1 |
| 2007/0104587 A1* | 5/2007 | Kawamura et al. | 417/32 |

FOREIGN PATENT DOCUMENTS

| | | |
|---|---|---|
| JP | 7-217580 A | 8/1995 |
| JP | 7-305689 A | 11/1995 |
| JP | 2000-329084 A | 11/2000 |

* cited by examiner

VACUUM PUMP UNIT

TECHNICAL FIELD

The present invention relates to a dry vacuum pump unit capable of achieving ultimate pressure of about 1 Pa.

BACKGROUND ART

A vacuum pump having the above-described pumping performance is used in a sputtering apparatus, a helium leak detector, an analyzer (e.g., SEM), and the like. Further, the vacuum pump having the above-described pumping performance is used as a roughing vacuum pump coupled to a high-vacuum pump, such as a turbo molecular pump, and is also used in a vacuum dryer or a vacuum bonding apparatus that sucks a gas, e.g., water vapor.

An oil-sealed rotary pump is typically used as a small-volume vacuum pump which is small size, portable, and inexpensive. However, this type of pump presents several problems including back diffusion of oil vapor into a vacuum chamber (contamination of the vacuum chamber and a workpiece), oil contamination of discharge lines (fire hazard), environmental pollution, a decrease in oil due to the oil diffusion, deterioration and fouling of oil as a result of oil contamination with moisture, and the need for routine supply and replacement of oil. Particularly, fluorine oil for use in the vacuum pump is expensive, and the oil replacement necessitates troublesome operations.

Thus, a scroll-type dry vacuum pump has recently been used as a substitute for the oil-sealed rotary pump. The scroll-type dry vacuum pump is oil-free, and has a scroll that provides a scrolling motion for continuously compressing a gas from vacuum to atmospheric pressure. This type of pump has advantageous features, such as a small driving power during an evacuating operation and a relatively high performance in view of ultimate pressure (about 1 Pa). However, this pump uses tip seals (contact seals) on edges of the scroll. These tip seals wear, producing particles which would contaminate the inside space of the vacuum chamber. Further, wear of the tip seals causes a fall in a pumping performance with time, and thus replacement of the tip seals is required as a result of continuous pump-operation for about one year. Moreover, replacement of the tip seals entails dismantling of the vacuum pump, which results in an increased replacement cost. The scroll-type dry vacuum pump also has problems of being large in size and high cost, compared with the oil-sealed rotary pump having the same volume.

In addition, because the scroll-type dry vacuum pump has the scrolling mechanism which provides compression processes, when evacuating a gas under the atmospheric pressure, compression of the gas becomes excessive, and consequently a large driving power is required. Further, the scroll-type dry vacuum pump has several drawbacks, such as condensation of water vapor due to the compression process, a difficulty in compensating an unbalance of a rotary member, and excessive vibration.

Thus, it has been customary in the semiconductor fabrication process to use a multistage Roots-type or screw type positive displacement dry vacuum pump having a relatively high pumping speed (at least 1000 L/min). In order to achieve ultimate pressure of not more than 1 Pa and a higher pumping speed, a main pump and a booster pump may be coupled in series via a pipe to constitute a single vacuum pump unit. The two-axis positive displacement dry vacuum pump does not use oil in gas passages thereof, and thus does not cause the oil contamination. Further, the positive displacement dry vacuum pump does not use the tip seals, and hence non-contact operation can be realized. These are the most remarkable features of the positive displacement dry vacuum pump.

However, this type of pump uses timing gears for synchronizing rotations of a pair of pump rotors in opposite directions with a small clearance maintained between the pump rotors, i.e., for allowing non-contact synchronized rotation in the opposite directions. Because the timing gears require oil lubrication, the above vacuum pump is not an oil-free pump, and necessitates maintenance, such as oil replacement. In addition, in order to prevent back contamination of oil vapor into gas passages, it is necessary to use $N_2$ gas or the like to purge the oil vapor.

When the gas, to be evacuated, is of the atmospheric pressure, the booster pump is not operated or the booster pump is operated at a low rotational speed, so that an excessive load is not applied thereto. In the main pump, a cooling device is generally provided for cooling heat of compression. Consequently, the operation of the two-axis positive displacement dry vacuum pump generally requires supply systems of cooling water, $N_2$ gas, and the like, in addition to electric power.

When evacuating a relatively high temperature gas containing water vapor for the purpose of vacuum drying or the like, the following problems would arise. Pressure at the inlet side of the vacuum pump unit is low, and therefore, the water vapor in the gas is maintained as it is. On the other hand, the outlet side is under the atmospheric pressure, and therefore the water vapor condenses on relatively low temperature portions of gas passages in the vacuum pump unit. As a result, the condensed water flows into the pump. Such water not only applies an excessive load to the pump, but also contaminates lubrication oil of bearings, causing a lowered lubrication performance that would greatly shorten the life of the pump.

Furthermore, arrangements of the pumps, pipes, and valves, each constituting the vacuum pump unit, are complex. Such complex arrangements would lower the efficiency of piping operations, and would also cause misconnecting of the pipes and operation failure of the vacuum pump unit.

DISCLOSURE OF INVENTION

The present invention has been made in view of the above drawbacks. It is therefore an object of the present invention to provide a low-noise vacuum pump unit which can realize a small and compact structure, sufficient ultimate pressure, low power consumption, no contamination due to oil or tip seals, no need for supply system of water or $N_2$ gas, evacuation from atmospheric pressure in a short period of time, and no overload and no failure due to condensed water. Another object of the present invention is to provide a pump mount base for use in a vacuum pump unit which incorporates not only a mount base for vacuum pumps, but also pipes and valves to facilitate piping operations and to prevent misconnecting the pipes and valves.

In order to achieve the above object, according to one aspect of the present invention, there is provided a vacuum pump unit including a main pump disposed at an outside-pressure side, and a booster pump disposed at a vacuum side. The booster pump and the main pump are coupled in series. The booster pump has a higher pumping speed than that of the main pump. Each of the main pump and the booster pump includes a pair of pump rotors, a casing having an inlet port and an outlet port, and a pair of magnet rotors rotatable with the pair of pump rotors.

In this specification, "outside pressure" means pressure developed around the vacuum pump unit, and more specifically means pressure in an outlet-side space that is in fluid communication with the vacuum pump unit.

In a preferred aspect of the present invention, the outlet port of the main pump is arranged at a lower end of a fluid passage formed in the casing.

In a preferred aspect of the present invention, the vacuum pump unit further includes a first check valve coupled to the outlet port of the main pump for preventing a fluid from flowing back into the main pump. The first check valve is operable to be opened when pressure of the fluid flowing through the outlet port of the main pump becomes higher than an outside pressure.

In a preferred aspect of the present invention, the vacuum pump unit further includes a second check valve arranged downstream of the first check valve.

In a preferred aspect of the present invention, the pair of pump rotors of the main pump comprises a pair of screw rotors.

In a preferred aspect of the present invention, the pair of magnet rotors of the main pump are arranged above the pair of pump rotors of the main pump.

In a preferred aspect of the present invention, the pair of pump rotors of the booster pump comprises a pair of screw rotors, the inlet port of the booster pump is provided at an upper portion of the casing of the booster pump, and the outlet port of the booster pump is provided at a lower portion of the casing of the booster pump.

In a preferred aspect of the present invention, the vacuum pump unit further includes a pump mount base having a substantially horizontal upper surface and a substantially vertical side surface. A communication passage is formed in the pump mount base for providing fluid communication between the outlet port of the booster pump and the inlet port of the main pump.

In a preferred aspect of the present invention, the booster pump is mounted on the upper surface of the pump mount base, and the main pump is mounted on the side surface of the pump mount base.

In a preferred aspect of the present invention, the pump mount base is formed from a single block of material.

In a preferred aspect of the present invention, a pressure release passage, branching off from the communication passage, is formed in the pump mount base. The pressure release passage is in fluid communication with an outlet pipe of the vacuum pump unit. A pressure release valve is provided between the pressure release passage and the outlet pipe. The pressure release valve is operable to be opened when pressure of the fluid in the communication passage becomes higher than the outside pressure.

In a preferred aspect of the present invention, a discharge passage is formed in the pump mount base, and the discharge passage is coupled to the outlet port of the main pump.

In a preferred aspect of the present invention, a check valve is provided in the discharge passage.

In a preferred aspect of the present invention, a pressure release passage and a pressure release valve are provided in the pump mount base. The pressure release passage branches off from the communication passage. The pressure release valve is operable to be opened when pressure of the fluid in the communication passage becomes higher than the outside pressure.

In a preferred aspect of the present invention, the pump mount base has an inverted L-shaped cross section and is fixed to a bottom portion of the vacuum pump unit. Electrical devices for driving the vacuum pump unit are arranged in a space formed at an interior-angle side of the pump mount base.

In a preferred aspect of the present invention, the vacuum pump unit further includes a cooling fan for cooling the main pump, the booster pump, and the electrical devices.

Another aspect of the present invention is to provide a pump mount base for use in a vacuum pump unit having a main pump disposed at an outside-pressure side and a booster pump disposed at a vacuum side. The pump mount base includes a communication passage formed therein for providing fluid communication between an outlet port of the booster pump and an inlet port of the main pump.

In a preferred aspect of the present invention, the pump mount base further includes a substantially horizontal upper surface and a substantially vertical side surface.

In a preferred aspect of the present invention, a pressure release passage, branching off from the communication passage, is formed in the pump mount base, a pressure release valve is provided in the pressure release passage, and the pressure release valve is operable to be opened when pressure of a fluid in the communication passage becomes higher than an outside pressure.

In a preferred aspect of the present invention, a discharge passage, to be coupled to an outlet port of the main pump, is formed in the pump mount base, and a check valve is provided in the discharge passage.

In a preferred aspect of the present invention, the pump mount base has an inverted L-shaped cross section.

According to the present invention, the magnet coupling action of the magnet rotors can allow the pump rotors to rotate synchronously in the opposite directions. Therefore, the need for using the timing gears can be eliminated, and an oil-free pump unit can thus be realized. Further, even if water vapor, contained in a gas, condenses on the pipe coupled to the main pump, the condensed water is prevented from flowing into the main pump. Therefore, overload and corrosion of the main pump can be avoided. Furthermore, by using the pump mount base, efficient piping operations can be realized and misconnecting of the pipes can be prevented. In addition, because the vacuum pump unit uses less components, a low cost can be achieved.

BEST MODE FOR CARRYING OUT THE INVENTION

Figure 1:
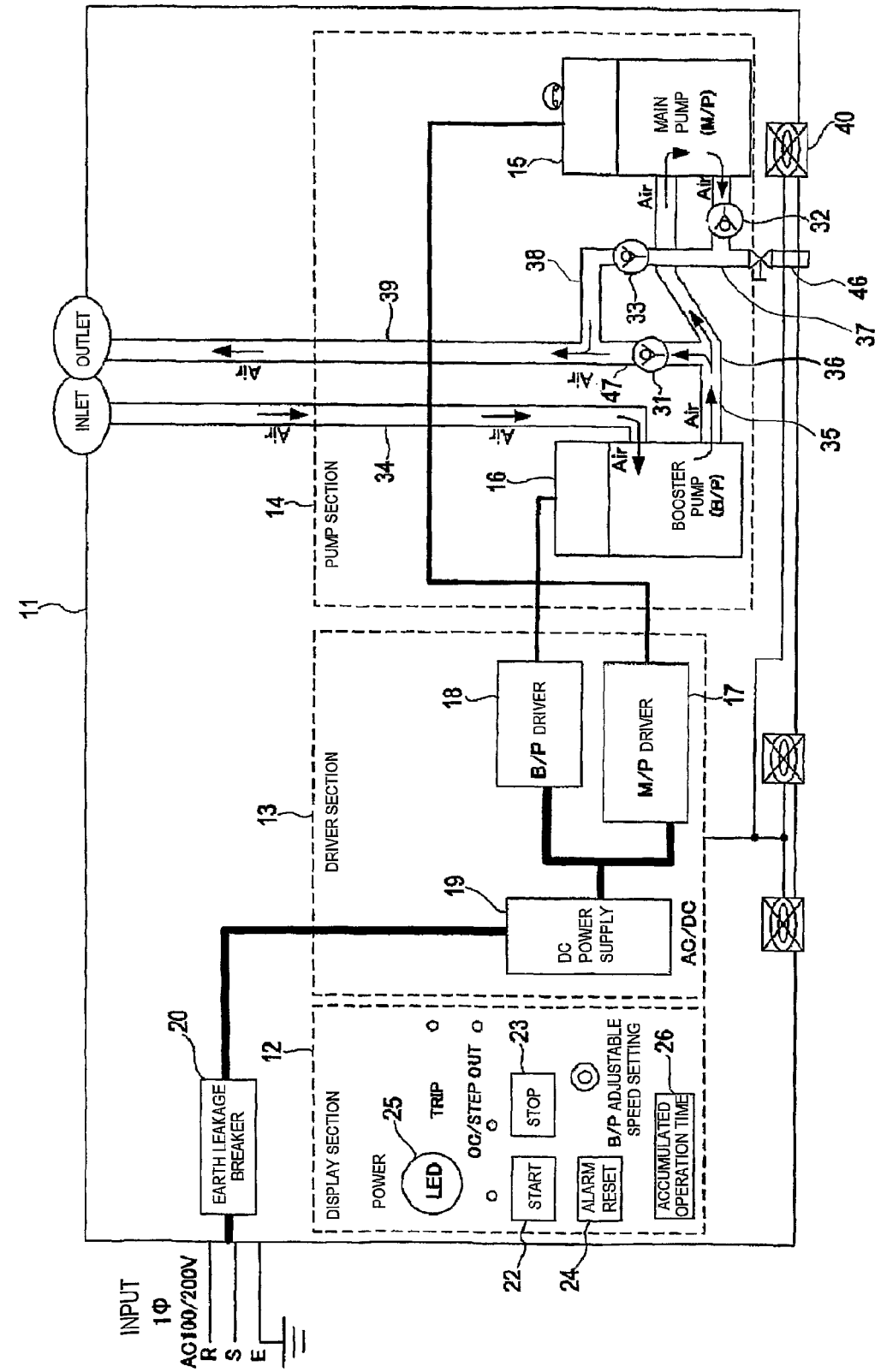
FIG. 1 is a schematic view showing a vacuum pump unit according to an embodiment of the present invention.

Embodiments of the present invention will be described below with reference to the attached drawings. Identical or corresponding elements are denoted by the same reference numerals and will not be repetitively described.

Figure 2:
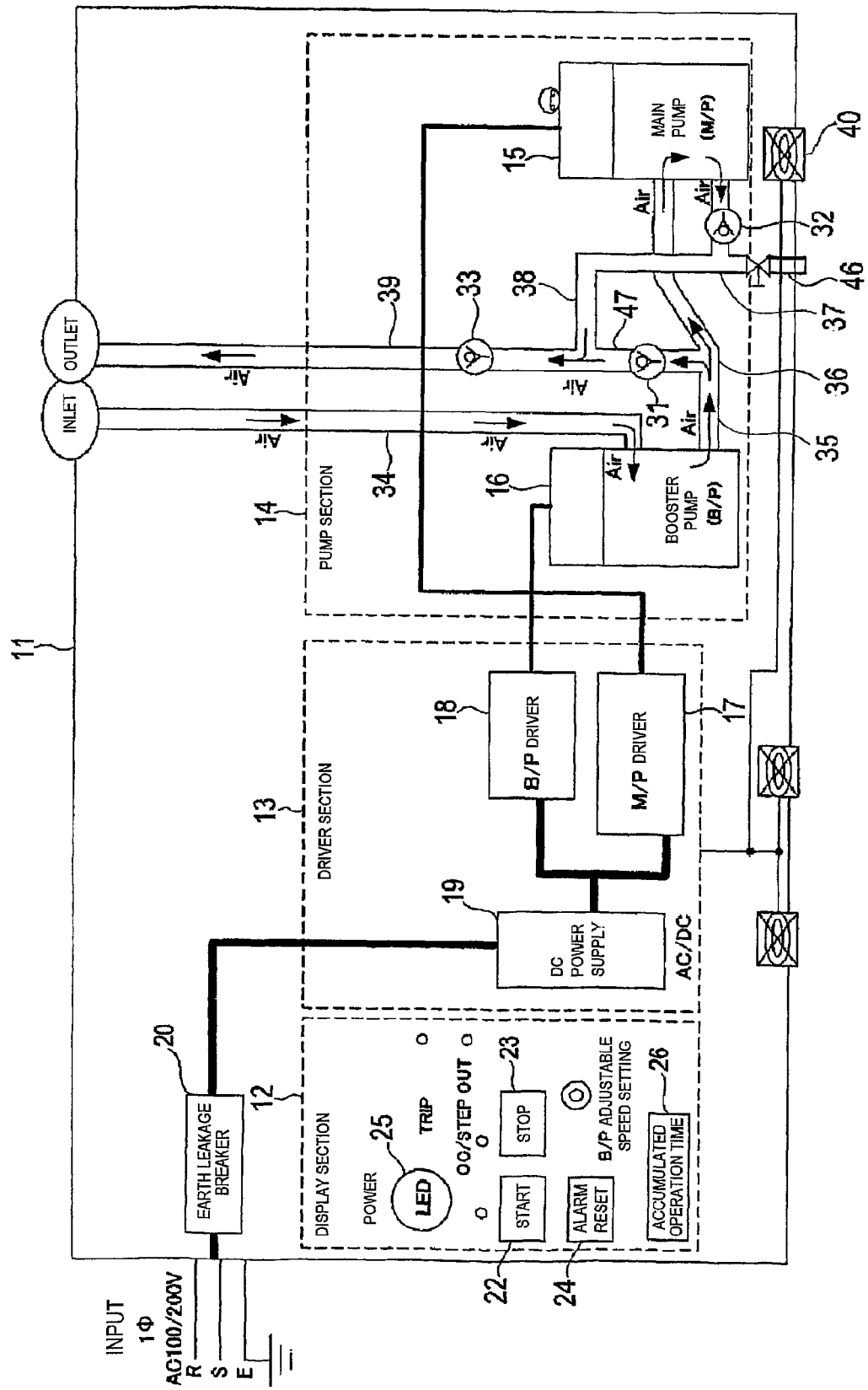
FIG. 2 is a schematic view showing a modification of the vacuum pump unit shown in FIG. 1.

FIG. 1 is a schematic view showing a vacuum pump unit according to an embodiment of the present invention. FIG. 2 is a view showing a modified arrangement of valves shown in FIG. 1. A vacuum pump unit 11 comprises a display section 12, a driver section 13, and a pump section 14. The pump section 14 includes two pumps, which are a main pump (roughing vacuum pump) 15 and a booster pump 16 coupled in series. These pumps have the same shape, the same size, and the same displacement volume, i.e., the same structure. However, the main pump 15 and the booster pump 16 may have different structures.

Each of the vacuum pumps 15 and 16 is a two-axis positive displacement screw pump which has no timing gears, but uses non-contact magnet coupling that provides synchronized rotations of two pump rotors in opposite directions so as to deliver a gas. The vacuum pumps are driven by motors, each of which is a brushless DC motor having motor rotors with permanent magnets. These motors are driven by adjustable-speed motor drivers 17 and 18, respectively.

The driver section 13 includes the motor driver 17 for the main pump 15, and the motor driver 18 for the booster pump 16. These drivers 17 and 18 independently drive the main pump 15 and the booster pump 16. A common DC power supply (AC/DC converter) 19 supplies direct-current power of, for example, 48 volts to the motor driver 17 and the motor driver 18. The respective drivers 17 and 18 convert the direct-current power to have a rectangular pulse waveform using PWM, and supply the resulting power respectively to drive windings of the vacuum pumps 15 and 16. Each of the motor drivers 17 and 18 uses a semiconductor power switching element to form the rectangular pulse waveform, so that the motor drivers 17 and 18 can rotate the vacuum pumps 15 and 16 at desired speeds. For example, the vacuum pump (main pump) 15, located at an outside-pressure side, is rotated at about 10000 $min^{-1}$, and the vacuum pump (booster pump) 16, located at a vacuum side, is rotated at a speed of from 20000 to 30000 $min^{-1}$, so that the rotational speed of the booster pump 16 is two to three times as high as that of the main pump 15. By rotating the vacuum pumps 15 and 16 at high speeds as described above, ultimate pressure of not more than 1 Pa can be reached with a small-sized structure. In this specification, "outside pressure" means pressure developed around the vacuum pump unit, and more specifically means pressure in an outlet-side space that is in fluid communication with the vacuum pump unit.

The vacuum pump unit 11 has a connection terminal for single-phase current power of 100 volts or 200 volts. The single-phase current power is supplied from an AC power source to the DC power supply 19 via an earth leakage breaker 20. The single-phase current power is converted by the DC power supply 19 into the direct-current power, which is supplied to the motor drivers 17 and 18. Power consumption of the main pump 15 during a normal operation is about 300 W, and power consumption of the booster pump 16 during a normal operation is about 100 W. Therefore, the vacuum pump unit as a whole uses low power for its operation, and a regular single-phase current power source can be used to supply sufficient electric power to drive the vacuum pump unit 11. Accordingly, the vacuum pump unit 11 can be used as a portable vacuum pump which can operate anyplace so long as a single-phase current power source is available.

The display section 12 has a start button 22, a stop button 23, and an alarm-reset button 24. The display section 12 further has a LED lamp 25 that indicates a power-on state, and a display panel 26 that displays an accumulated operation-time. It is easy to operate this vacuum pump unit 11. Specifically, by pushing the start button 22, the main pump 15 and the booster pump 16 start rotating to perform evacuation. Further, by pushing the stop button 23, supply of the electric power to the vacuum pumps 15 and 16 is shut off, whereby the operation is stopped.

The main pump 15 and the booster pump 16 have the same size and the same displacement volume, as described above. The booster pump 16 is arranged at the inlet side (vacuum side), rotates at a speed of from 20000 to 30000 $min^{-1}$, and has a pumping speed of about 250 L/min. On the other hand, the main pump 16 is arranged at the outlet side (outside-pressure side), rotates at a speed of about 10000 $min^{-1}$, and has a pumping speed of about 100 L/min. Thus, the rotational speed of the booster pump 16 is two to three times as high as that of the main pump 15. This operation allows the vacuum pump unit 11 to realize the ultimate pressure of about 1 Pa at the vacuum chamber side, which could not be obtained by this type of single vacuum pump. Although the booster pump 16 rotates at a high speed, it is disposed at the vacuum side. Accordingly, the power consumption is as low as about 100 W. On the other hand, because the main pump 15 rotates against the outside pressure, the power consumption is as high as about 300 W.

Figure 3:
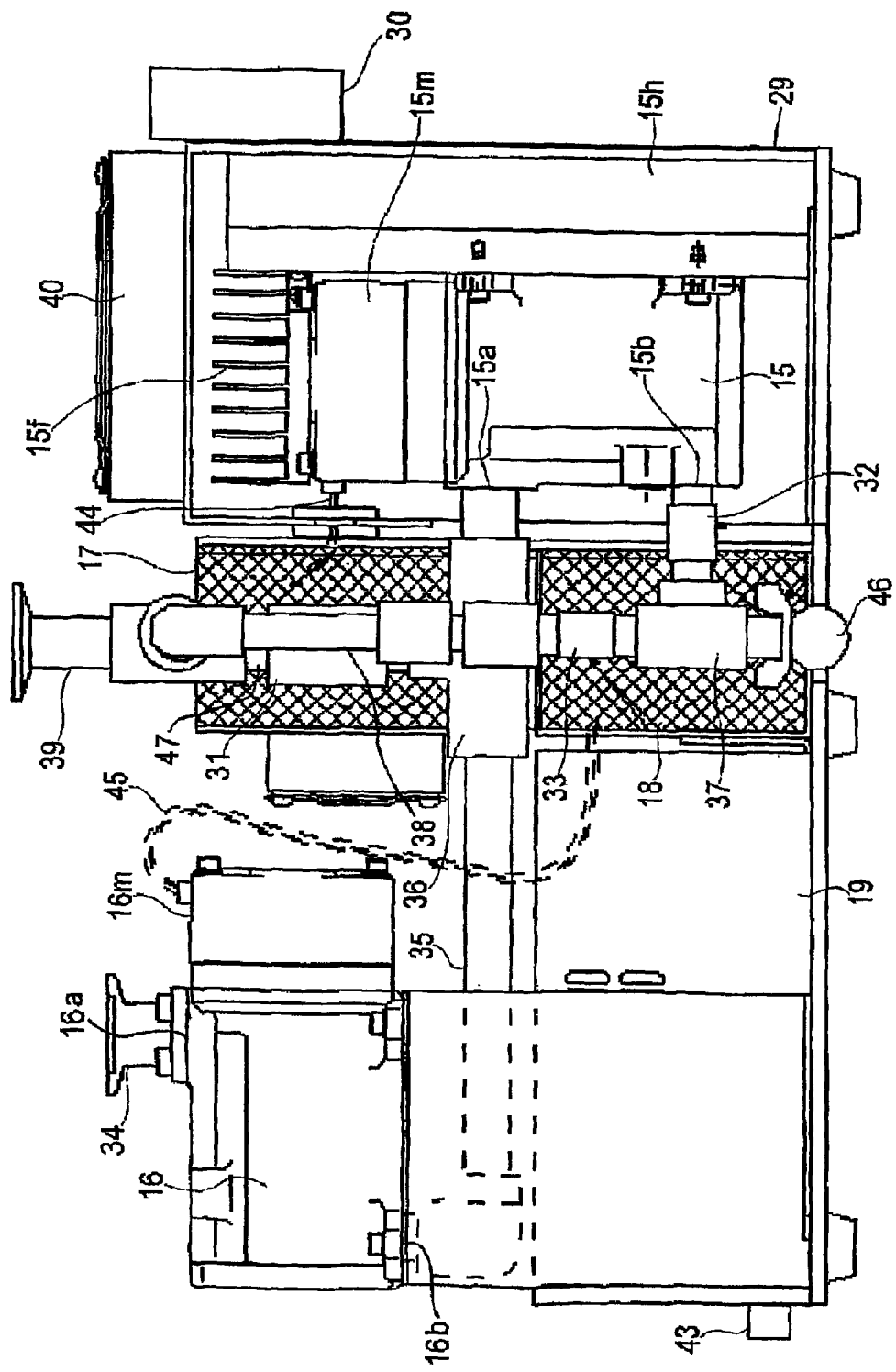
FIG. 3 is an elevation view showing a structural example of the vacuum pump unit shown in FIG. 1.
Figure 4:
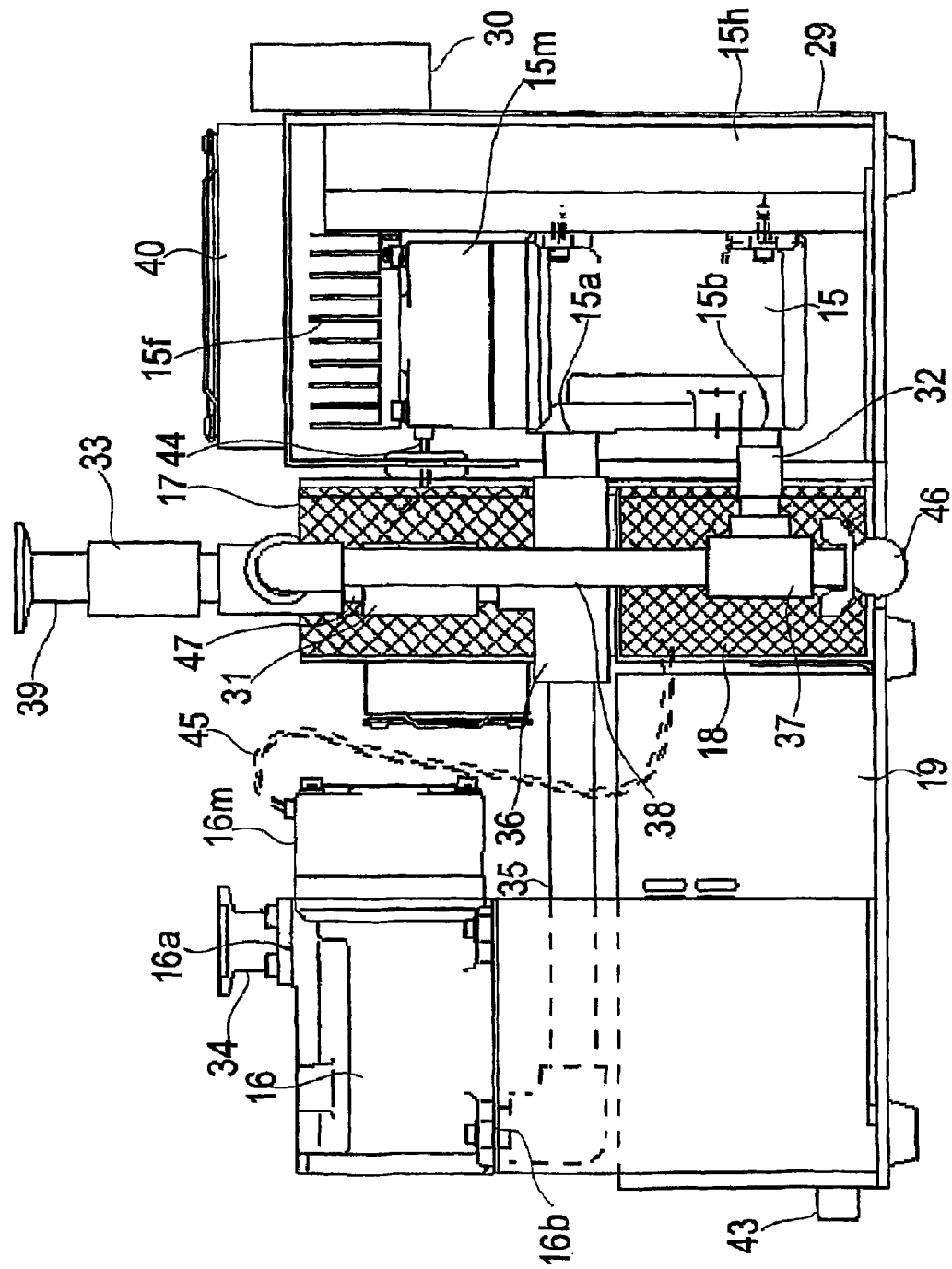
FIG. 4 is an elevation view showing a modification of the vacuum pump unit shown in FIG. 3.

FIGS. 3 and 4 show arrangement examples of components of the dry vacuum pump unit discussed above. The main pump 15 is vertically mounted on a base 29, and has therein a pair of screw rotors (as will be described later) operable to suck a gas through an inlet port 15a, to deliver it downwardly, and to discharge it through an outlet port 15b. A fin 15f is attached to a motor 15m of the main pump 15. The main pump 15 is attached to a heat sink 15h, and is cooled by an air introduced into the vacuum pump unit by a cooling fan 40. This cooling fan 40 cools not only the main pump 15, but also the booster pump 16, the motor drivers 17 and 18, the DC power supply 19, and other components. Therefore, this vacuum pump unit does not require any system of supplying cooling water and $N_2$ gas. In this embodiment, the air is sucked by the cooling fan 40 from the DC power supply side into the vacuum pump unit to cool the motor drivers 17 and 18, the booster pump 16, and the main pump 15 in this order. Because the air cools these components in the order of increasing temperature, efficient cooling effect can be obtained. A non-illustrated casing may cover the base 29 so as to provide a rectangular dry vacuum pump unit.

The booster pump 16 is horizontally mounted on the base 29, and has therein a pair of screw rotors (as will be described later) operable to suck the gas through an inlet pipe 34 and an inlet port 16a and to discharge the gas through an outlet port 16b thereof. This outlet port 16b is in fluid communication with the inlet port 15a of the main pump 15 via a pipe (communication passage) 35 and a branch pipe 36. The outlet port 15*b* of the main pump 15 is coupled to an outlet pipe 39, communicating with the outside space, via a branch pipe 37 and a pipe 38.

The base 29 has a connection terminal 43, which is to be coupled to the AC power source of 100 volts or 200 volts via an AC outlet. The connection terminal 43 is electrically connected to the DC power supply 19, where the AC power is converted into the DC power of 48 volts, which is supplied to the motor drivers 17 and 18. The driving power with the rectangular pulse waveform is supplied from the motor driver 17 to the motor 15*m* of the main pump 15 via cables 44. Similarly, the driving power with the rectangular pulse waveform is supplied from the motor driver 18 to the motor 16*m* of the booster pump 16 via cables 45. A control panel 30 is attached to one side of the base 29, so that start-and-stop control of the pumps is performed.

Both the maim pump 15 and the booster pump 16 use the magnet coupling for synchronizing the rotations of the pump rotors, and thus do not use contact members including the timing gears. Accordingly, the pump rotors can rotate at a high speed. As a result, a high pumping speed and low ultimate pressure of about 1 Pa can be obtained even though the pump rotors are small in size. Further, no use of timing gears results in no need to provide any system for supplying the lubricating oil, the cooling water, the purge gas, and the like. Therefore, the vacuum pump unit can be compact. As one example, the base 29 of the vacuum pump unit according to this embodiment is 40 cm long, 17 cm wide, and 27 cm high. Therefore, this unit is very small and compact as compared with the oil-sealed rotary pump and the dry scroll pump having the same performance. Further, this unit weights not more than 15 kg, which is very light.

The pipe 35, which provides fluid communication between the main pump 15 and the booster pump 16, is connected to the branch pipe (T-shaped pipe) 36. This branch pipe 36 is connected to a pipe (pressure release passage) 47, which is connected to the outlet pipe 39 that is in fluid communication with the outside of the unit. A pressure release valve (check valve) 31 is provided in the pipe 47. With this arrangement, when high pressure is developed in the pipe 35 between the main pump 15 and the booster pump 16, the pressure release valve 31 is opened to allow the pipe 35 to communicate with the outside via the outlet pipe 39. The pressure release valve (check valve) 31 has a structure in which a valve element is urged by a spring to press an elastic member, such as O-ring (rubber ring), to thereby seal a path thereof. This valve 31 is operable to be opened only when the pressure in the pipe 35 becomes higher than the outside pressure.

During evacuation of the vacuum chamber under the outside pressure via the inlet pipe 34, because the pumping speed of the booster pump 16 is higher than that of the main pump 15, the gas in the pipe 35 is excessively compressed. The pressure release valve (check valve) 31 can allow this excessively compressed gas to escape into the outside of the unit. Therefore, the pressure release valve 31 can prevent excessive compression of the gas to thereby secure safe operation, and can also prevent an increase in driving power required when evacuating the vacuum chamber under the outside pressure (i.e., when the inlet-side pressure is equal to the outside pressure). Furthermore, the pressure release valve 31 can allow the booster pump 16 to keep its pumping speed as it is, while allowing the main pump 15 to continue its operation, thus avoiding lowering of the pumping speed at the time of start-up. Accordingly, a desired vacuum can be achieved in a short period of time.

If the pressure release valve 31 is not provided, in order to avoid the excessive compression of the gas, it is necessary to start the pumps in the following two ways. The first way is to start the main pump for evacuation of the chamber and, when the chamber is evacuated to a certain degree, then start the booster pump. The second way is to start the booster pump in advance at a low speed and start the main pump. In these cases, because the pumping speed at the time of start-up is determined mainly by the main pump, the pumping speed of the unit is low and a certain period of time is needed to reach the desired vacuum. On the other hand, according to the above-discussed vacuum pump unit provided with the pressure release valve 31, the booster pump 16 having a high pumping capability can directly evacuate the gas of the outside pressure. Therefore, a desired vacuum can be reached in a short period of time.

Operational conditions of the pressure release valve 31 are such that the valve element is quickly closed as a result of pressure difference between the upstream side and the downstream side thereof, and is quickly opened when the pressure difference is eliminated. With this structure, when the inlet-side pressure is lowered from the outside pressure to vacuum, the pressure release valve 31 is quickly closed, resulting in no loss of a pumping time. During the normal operation, the pressure release valve 31 is closed at all times, and can thus prevent pumping noise of the booster pump 16 from escaping into the outside of the vacuum pump unit.

In addition to the above arrangements, a pressure release valve (a first check valve) 32 is coupled to the outlet port 15*b* of the main pump 15. This pressure release valve 32 also has a structure in which a valve element is urged by a spring to press an elastic member, such as O-ring (rubber ring). With this arrangement, while the normal operation is performed to produce vacuum in the vacuum chamber, the pressure release valve 32 is almost closed. Thus, the pumping noise of the main pump 15 can be prevented from escaping into the outside of the vacuum pump unit. Furthermore, even if the main pump 15 is stopped due to some sort of failure, the pressure release valve 32, which is closed, can prevent breakage of the vacuum in the chamber. The pressure release valve 32 can also prevent water droplets, which are produced on the inner surfaces of the pipe 38 and the branch pipe 37, from flowing back into the main pump 15, thus avoiding overload and corrosion of the main pump 15. In addition, because the entrance of the moisture into the upstream side can be prevented, the vacuum, developed in the vacuum chamber, can be maintained.

A check valve (a second check valve) 33 is provided in the pipe (the pipe 38 in FIGS. 1 and 3, the outlet pipe 39 in the FIGS. 2 and 4) at a position downstream of the above-described pressure release valve 32. This check valve 33 may comprise a spring-type check valve that is opened when the pressure in the pipe 38 becomes higher than the outside pressure. Instead of the spring-type check valve, a ball-type check valve can be used so long as the valve is opened when the pressure, upstream of the check valve, becomes higher than the outside pressure. With this arrangement, a space in the pipe between the pressure release valve 32 and the check valve 33 provides a buffer space. A fluid in this buffer space serves as a damper that absorbs the pumping noise of the main pump 15 and open-close noise of the pressure release valve 32. Particularly, as shown in FIGS. 2 and 4, providing the check valve 33 in the outlet pipe 39 can contribute to lowering the noise from both the pressure release valves 31 and 32.

If a gas enters the vacuum chamber from outside thereof while the vacuum pumps 15 and 16 are in the normal operations, the pressure at the outlet port 15*b* of the main pump 15 may become higher than the outside pressure, and the pressure release valve 32 may be opened and then quickly closed by the spring. Even in such a case, the pumping noise of the main pump 15 and open-close noise of the pressure release valve 32 are trapped in the above-described buffer space, and thus do not escape into the outside of the vacuum pump unit. Therefore, a low-noise structure can be achieved in the vacuum pump unit.

The pipe 38, which is disposed downstream of the main pump 15, is connected to the pipe 47, branching off from the branch pipe 36, at a position downstream of the pressure release valve 31. More specifically, the pipe 38 and the pipe 47 are joined into the single outlet pipe 39. With these arrangements, a simple structure with the single inlet pipe 34 and the single outlet pipe 39 can be obtained.

The branch pipe 37 is coupled to an outlet of the pressure release valve 32. This branch pipe 37 has an upper outlet port connected the pipe 38 extending substantially vertically, and has a lower outlet port connected to a water-discharge pipe (drain) 46 through which the condensed water flows downwardly due to gravity. The gas, expelled from the main pump 15, has a high temperature because the gas is heated while passing through the main pump 15. This gas is then cooled in the pipe 38, whereby the moisture condenses to form water, which flows down through the pipe 38 due to gravity. The condensed water further flows from the branch pipe 37 into the drain 46 due to gravity, and is then drained. With this arrangement, the condensed water can be prevented from flowing back into the pressure release valve 32, and thus the pressure release valve 32 can be kept clean. The pipe 38 may not be mounted vertically, but may be inclined with respect to a horizontal plane so as to allow the condensed water to easily flow downwardly.

Next, operation of the vacuum pump unit having the above structure will be described. First, the start button 22 is pushed to turn on the unit, whereby both the booster pump 16 and the main pump 15 are soft-started to perform evacuation. Then, the respective rotational speeds of the booster pump 16 and the main pump 15 reach the preset speeds of the normal operations thereof, and the pumps 15 and 16 keep performing evacuation. Since the pumping speed of the booster pump 16 is higher than that of the main pump 15, the pressure in the pipe 35 increases, and the load on the booster pump 16 also increases. When the pressure in the pipe 35 exceeds the outside pressure (i.e., the ambient pressure of the vacuum pump unit), the pressure release valve 31 is opened to thereby release the pressure in the pipe 35. As a result, the load on the booster pump 16 is kept constant.

As the pressure in the vacuum chamber decreases, the pressure in the pipe 35 decreases, and thus the pressure release valve 31 is closed. Simultaneously, the load on the booster pump 16 also decreases. When the pressure in the vacuum chamber further decreases to reach the ultimate pressure, the pressure difference between the inlet side and the outlet side of the booster pump 16 becomes small (i.e., the vacuum is developed at both the inlet side and the outlet side). In this state, the booster pump 16 operates under almost no-load conditions. On the other hand, the pressure difference between the inlet side and the outlet side of the main pump 15 is large (i.e., the vacuum at the inlet side, and the outside pressure at the outlet side). As a result, almost rated load is applied to the main pump 15. In this state, even if the main pump 15 is stopped due to some failure, the pressure release valve 32 is quickly closed to thus prevent breakage of the vacuum developed in the vacuum chamber.

In this manner, this vacuum pump unit can perform its start-up operation and normal operation without any sensor for detecting pressures or flow rates. Only control of the soft start of the vacuum pumps is performed, and feedback operation control of pressures or flow rates is not needed. As a result, the vacuum pump unit can be of simple-structure and low cost.

Figure 5:
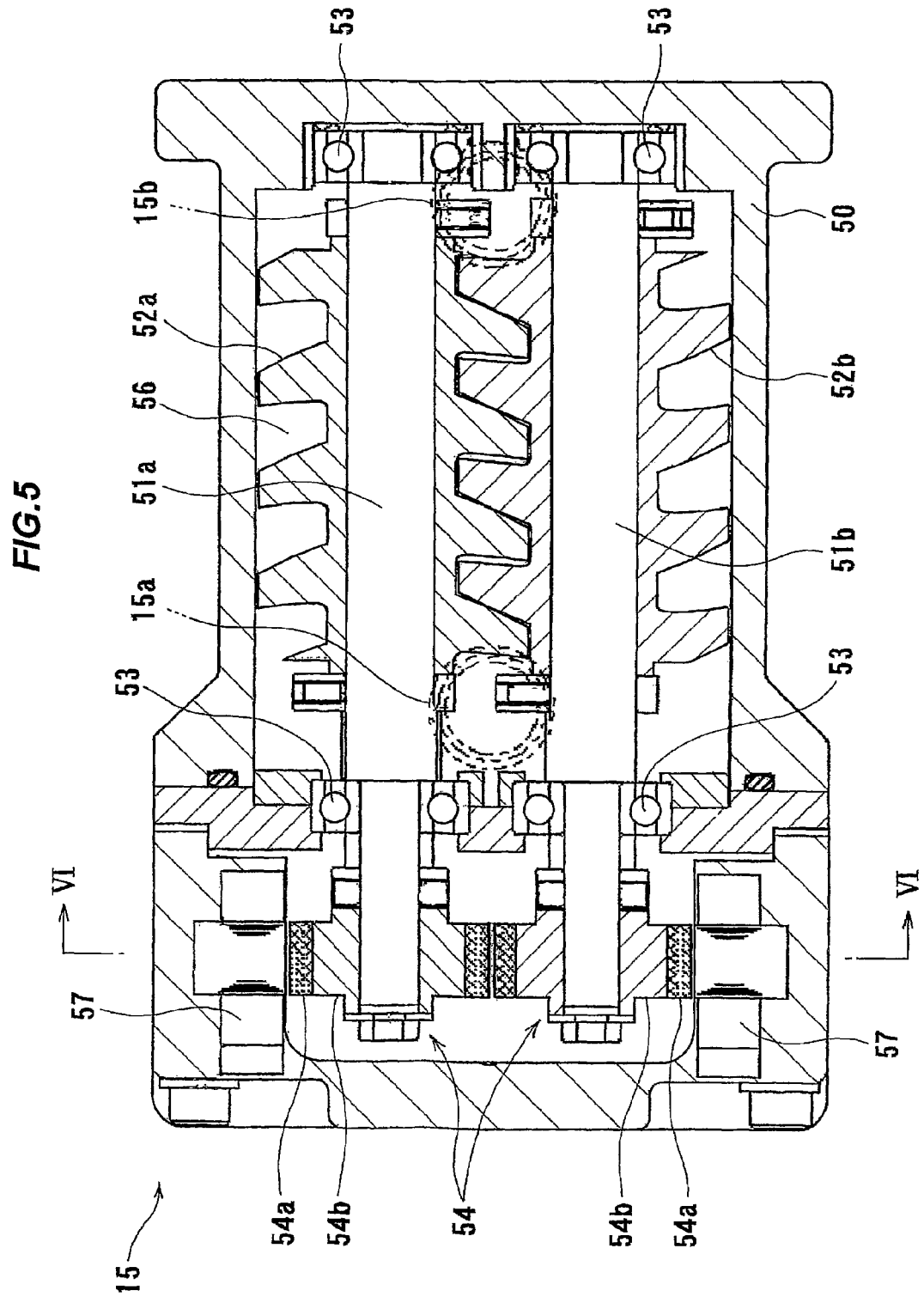
FIG. 5 is a cross-sectional view showing a structure of the vacuum pump shown in FIGS. 3 and 4.
Figure 6:
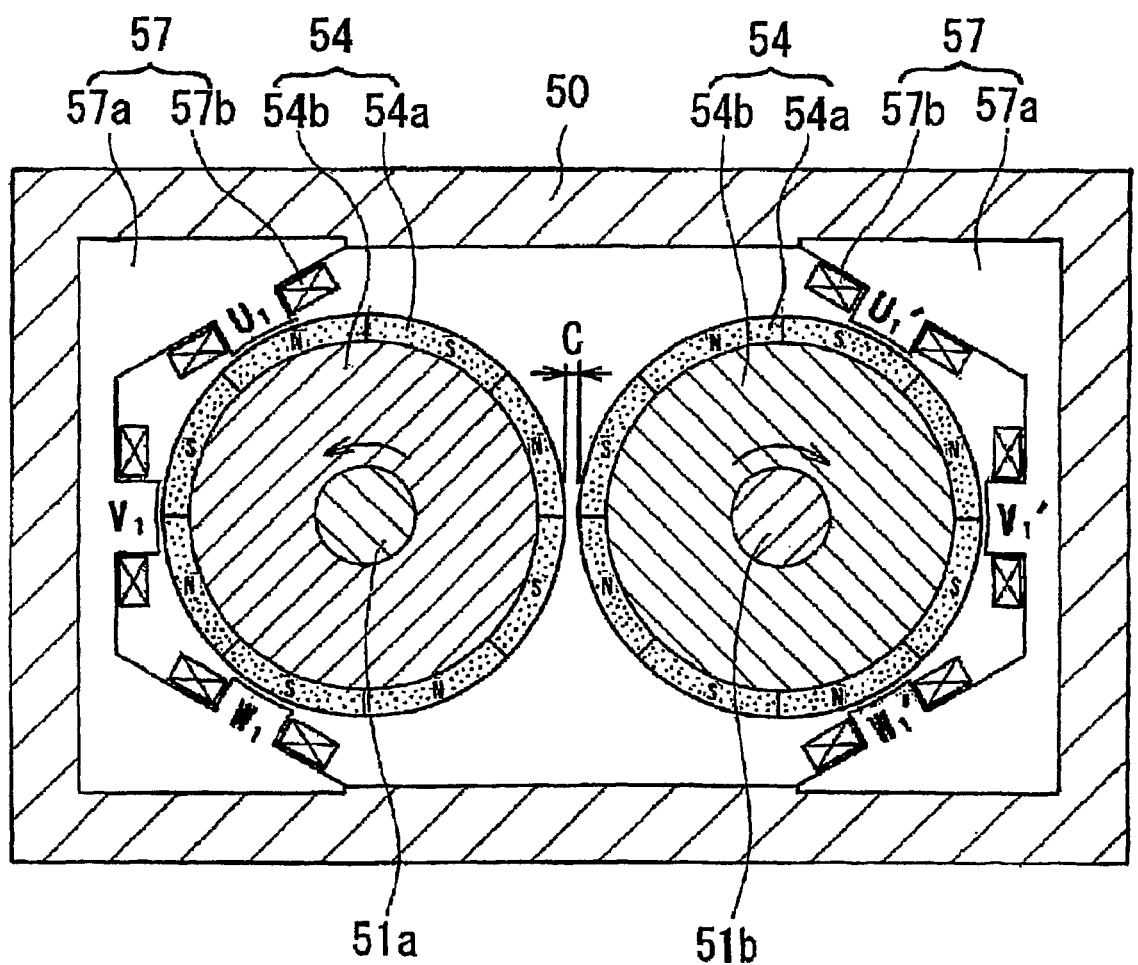
FIG. 6 is an enlarged cross-sectional view taken along line VI-VI in FIG. 5.

Next, a structural example of the above vacuum pumps 15 and 16 will be described with reference to FIGS. 5 and 6. Each of the vacuum pumps 15 and 16 is a two-axis positive displacement screw pump which does not have timing gears but has a pair of non-contact magnets (i.e., magnet coupling) that synchronize rotations of a pair of screw rotors in opposite directions so as to deliver a gas. In this embodiment, the main pump 15 and the booster pump 16 have the same structure, and only the main pump 15 will be described below.

Two parallel shafts 51a and 51b are disposed in a casing 50, and are supported by bearings 53. A right-hand screw rotor 52a is fixed to the shaft 51a, and a left-hand screw rotor 52b is fixed to the shaft 51b. A fluid passage 56 is formed between an inner surface of the casing 50 and the screw rotors 52a and 52b. The inlet port 15a is provided at an upstream end of the fluid passage 56, and the outlet port 15b is provided at a downstream end of the fluid passage 56. The screw rotors 52a and 52b are to rotate in the opposite directions with a small clearance formed therebetween, i.e., in a non-contact state, to thereby suck a gas through the inlet port 15a and deliver the gas to the outlet port 15b. The screw rotors 52a and 52b may be a pair of screw rotors each having an axial tooth profile that allows the screw rotors to be in contact with one another only on a pitch line.

A pair of magnet rotors 54 and 54, having the same structure, are mounted respectively on inlet-side end portions of the shafts 51a and 51b. These magnet rotors 54 and 54 serve as a part of a brushless DC motor, and provide the magnet coupling that secures synchronized rotation of the shafts 51a and 51b in the opposite directions. As shown in FIG. 6, each of the magnet rotors 54 and 54 has a yoke 54b made of a magnetic material, and a ring-shaped magnet 54a mounted on a circumferential surface of the yoke 54b. In this embodiment, the magnet 54a has eight magnetic poles. The magnet rotors 54 and 54 are disposed so as to attract one another by the opposite magnetic poles with a clearance C kept therebetween. The number of magnetic poles of the magnet rotor 54 is an even number, such as 4, 6, 8, . . . .

The screw rotors 52a and 52b rotate synchronously in the opposite directions by the magnet coupling action of the magnet rotors 54 and 54. Accordingly, the magnet coupling action enables the screw pump to have a structure in which the stably synchronized rotation of the two shafts is performed without the timing gears. No gear means no need of lubrication oil and realizes a complete non-contact rotation. Therefore, the screw pump can operate at a high rotational speed. More specifically, the screw pump having the eight-pole magnet rotors 54 and 54 can operate at a speed of from 10000 to 30000 $min^{-1}$. On the other hand, a rotational speed of a pump having a contact-type synchronizing mechanism using timing gears is from 6000 to 7000 $min^{-1}$. Therefore, use of the magnet rotors that provide the magnet coupling action can allow the small-sized vacuum pump to achieve an improved pumping performance, e.g., a high ultimate vacuum.

Three-phase (U, V, W) motor stators 57, each having iron cores 57a and windings 57b, are provided near part of the circumferential surfaces of the magnet rotors 54 and 54. Each of the three-phase motor stators 57 is arranged at an opposite side of the magnet coupling side of the magnet rotors 54 and 54 with respect to the shaft. With this arrangement, an attracting force acting between the magnet rotor 54 and the iron cores 57a can cancel the magnet coupling force acting between the magnet rotors 54 and 54. Magnetic poles of the three-phase motor stator 57 are such that an angle between the adjacent phases is 60 degrees so as to correspond to the eight poles of the magnet rotor 54. The direct current having a rectangular pulse waveform is supplied to the three-phase windings 57b, whereby the two shafts 51a and 51b rotate synchronously in the opposite directions at a desired speed.

In the positive displacement screw pump, the gas is delivered in the axial direction by the rotations of the screw rotors 52a and 52b. As shown in FIGS. 3 and 4, since the main pump 15 is mounted vertically such that the outlet port 15b is below the inlet port 15a, the outlet port 15b is positioned at the lower end of the fluid passage 56. With this arrangement, water (e.g., condensed water) can be prevented from flowing into the casing 50 due to gravity, and overload and corrosion of the main pump 15 can thus be prevented. Further, because the magnet rotors 54 and 54 and the motor stators 57 and 57 are located above the screw rotors 52a and 52b (i.e., above the fluid passage 56), even if water enters the casing 50 through the outlet port 15b, such water does not come into contact with those components. For this reason, the main pump 15 is installed with a certain gradient from a horizontal direction so that the outlet port 15b is positioned below the inlet port 15a. In this embodiment, as one example of the pump installation, the screw rotors 52a and 52b of the main pump 15 are disposed substantially vertically.

Figure 7:
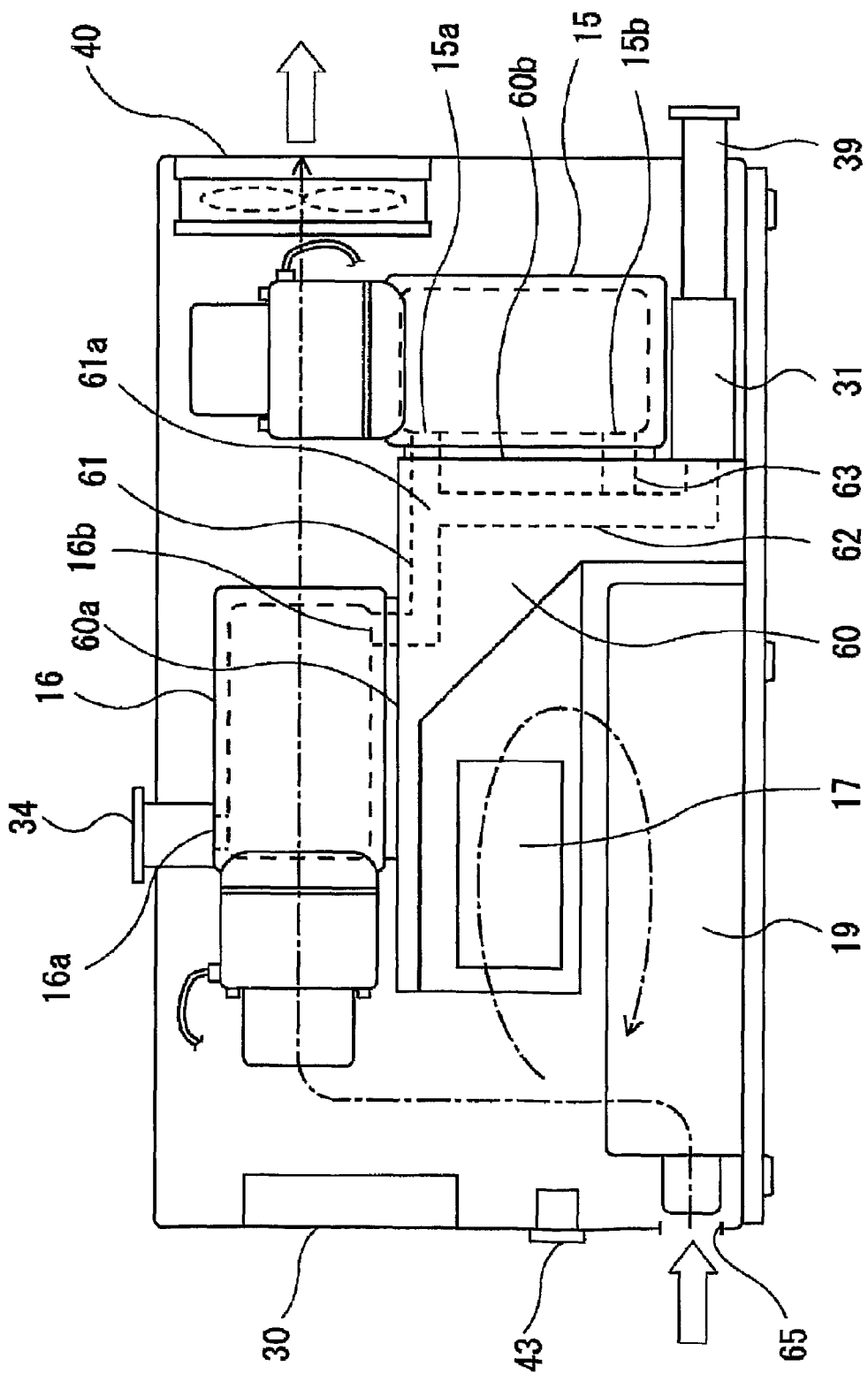
FIG. 7 is a side view showing a vacuum pump unit according to another embodiment of the present invention.
Figure 8:
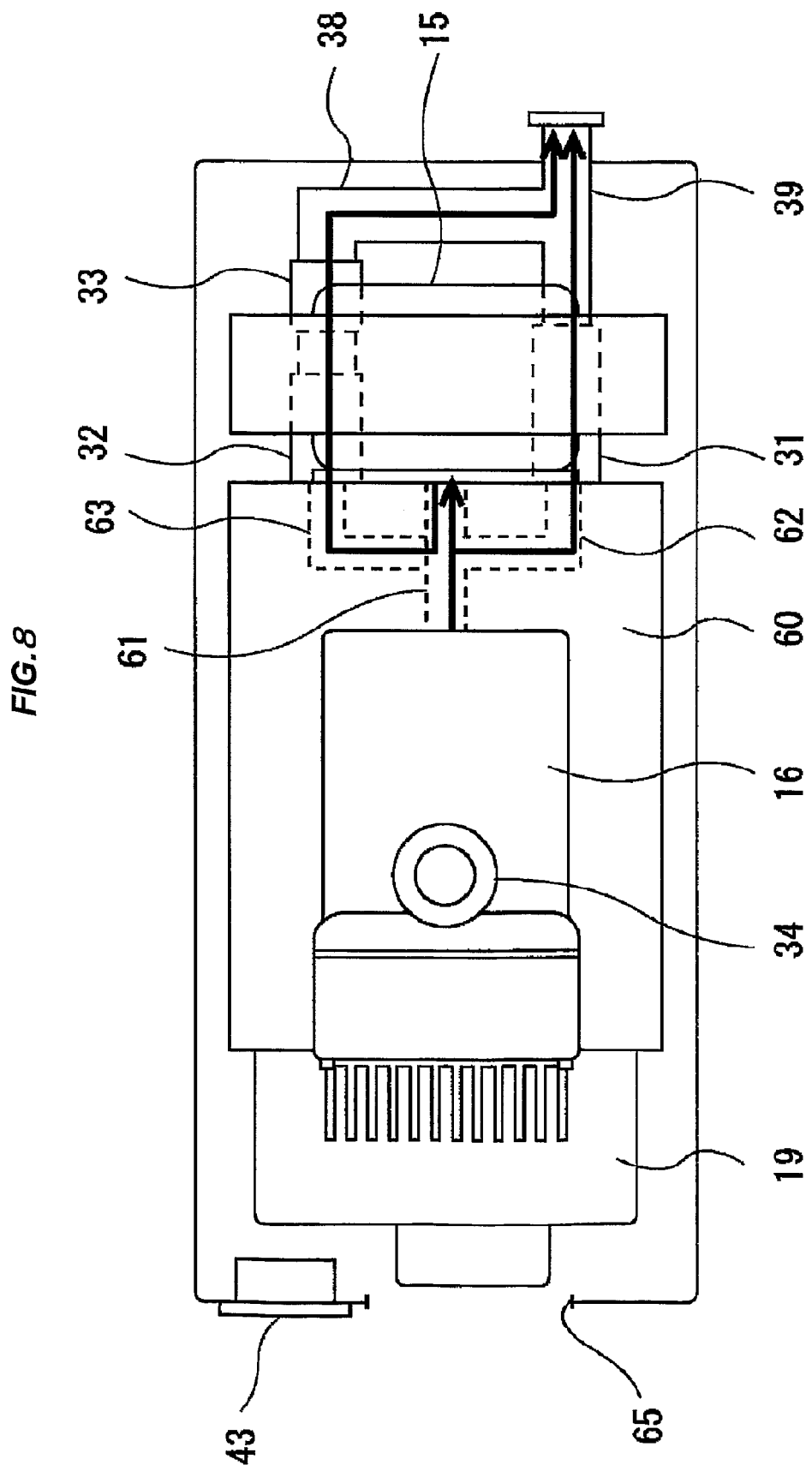
FIG. 8 is a plan view of the vacuum pump unit shown in FIG. 7.
Figure 9A:
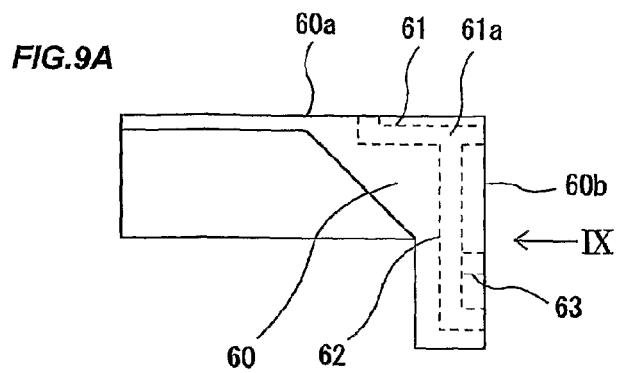
FIG. 9A is a side view of a pump mount base shown in FIG. 7.
Figure 9B:
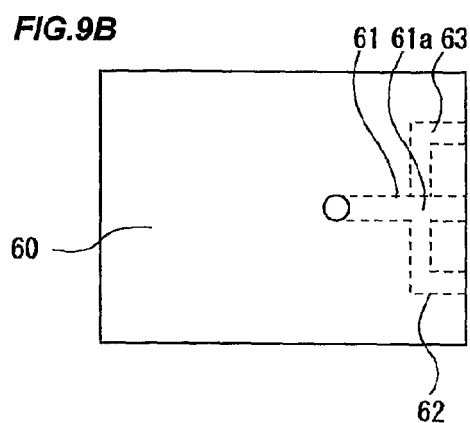
FIG. 9B is a plan view of the pump mount base shown in FIG. 9A.
Figure 9C:
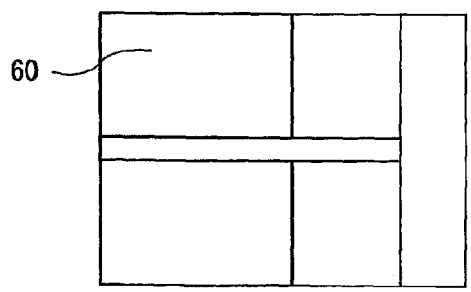
FIG. 9C is a bottom view of the pump mount base shown in FIG. 9A.
Figure 9D:
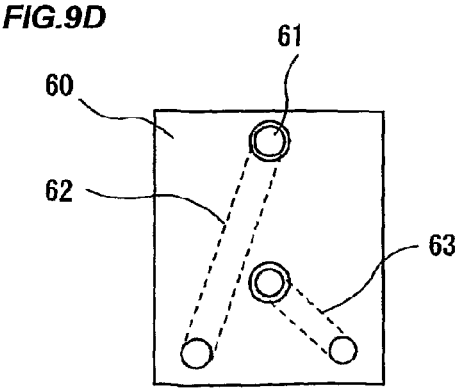
FIG. 9D is a view of the pump mount base as viewed from a direction indicated by arrow IX in FIG. 9A.

Next, another embodiment of the present invention will be described with reference to FIGS. 7 through 12. FIG. 7 is a side view showing a vacuum pump unit according to another embodiment of the present invention, and FIG. 8 is a plan view of the vacuum pump unit shown in FIG. 7. FIG. 9A is a side view of a pump mount base shown in FIG. 7, FIG. 9B is a plan view of the pump mount base shown in FIG. 9A, FIG. 9C is a bottom view of the pump mount base shown in FIG. 9A, and FIG. 9D is a view of the pump mount base as viewed from a direction indicated by arrow IX in FIG. 9A. Components and operations equal to those of the above-described embodiment will not be described repetitively.

A pump mount base 60, having an inverted L-shaped cross section, is disposed in the vacuum pump unit. This pump mount base 60 has a substantially horizontal upper surface 60a, a substantially vertical side surface 60b, and a bottom surface fixed to a bottom portion of the vacuum pump unit. The booster pump 16 is mounted on the upper surface 60a, and the main pump 15 is mounted on the side surface 60b. With this arrangement, the booster pump 16 is disposed substantially horizontally, and as a result, the pair of screw rotors of the booster pump 16 are also disposed substantially horizontally. On the other hand, the main pump 15 is disposed substantially vertically, and as a result, the pair of screw rotors of the main pump 15 are disposed substantially vertically.

A communication passage 61 (corresponding to the pipe 35 in the above-described embodiment) is formed in the pump mount base 60. One open end of the communication passage 61 lies in the upper surface 60a, and is coupled to the outlet port 16b of the booster pump 16. Another open end lies in the side surface 60b, and is coupled to the inlet port 15a of the main pump 15. The communication passage 61 has a branch portion 61a (corresponding to the branch pipe 36 in the above-described embodiment) where a pressure release passage 62 (corresponding to the pipe 47 in the above-described embodiment) branches off from the communication passage 61. The pressure release passage 62 has an open end that lies in a lower portion of the side surface 60b of the pump mount base 60. This open end of the pressure release passage 62 is coupled to pressure release valve (check valve) 31, which is coupled to outlet pipe 39.

A discharge passage 63 is further formed in the pump mount base 60. The discharge passage 63 has open ends which lie in the side surface 60b of the pump mount base 60. One of the open ends of the discharge passage 63 is coupled to the outlet port 15b of the main pump 15, and another is coupled to check valve 32. Check valve 33 is coupled to the outlet of the check valve 32, and the check valve 33 is further connected to pipe 38. Both the pressure release valve 31 and the pipe 38 are connected to the outlet pipe 39. In this embodiment, the pump mount base 60 can provide the communication passage 61, the pressure release passage 62, the discharge passage 63, and the base of the main pump 15 and the booster pump 16. Therefore, the vacuum pump unit can be compact as a whole, and a lowered production cost can be achieved. Further, maintenance of the communication passage 61, the pressure release passage 62, and the discharge passage 63, which are provided as a manifold, can be easily performed.

The pressure release valve 31, the check valves 32 and 33, the pipe 38, and the outlet pipe 39 lie in the same horizontal plane, and they are all positioned below the outlet port 15b of the main pump 15. Therefore, the condensed water on the inner surfaces of the pipe 38 and the outlet pipe 39 does not flow into the main pump 15. Such water is drained via the outlet pipe 39 to the outside of the vacuum pump unit.

As shown in FIG. 7, motor drivers 17 and 18 are arranged in parallel in a space formed at an interior-angle side of the pump mount base 60 (only the motor driver 17 is shown in FIG. 7). DC power supply (AC/DC converter) 19 is disposed below the motor drivers 17 and 18. With these arrangements, even if moisture condenses on the outer surface of the booster pump 16 and the outer surface of the inlet pipe 34, each having a relatively low temperature, the condensed water does not drip onto the motor drivers 17 and 18 and the DC power supply 19 because the pump mount base 60 interrupts such dripping water. Therefore, failures of these electrical devices can be prevented.

Cooling fan 40 is provided beside the main pump 15, and a ventilating hole 65 is formed beside the DC power supply 19. The cooling fan 40 and the ventilating hole 65 are arranged substantially symmetrically about a center of the vacuum pump unit. Therefore, as the cooling fan 40 operates, the air is introduced into the vacuum pump unit through the ventilating hole 65, and the air flows across the internal space of the vacuum pump unit, as indicated by arrow shown in FIG. 7. This air, passing through the vacuum pump unit, cools the DC power supply 19, the booster pump 16, and the main pump 15 in this order, and is discharged to the exterior of the unit via the cooling fan 40. Part of the air, which was introduced through the ventilating hole 65, forms an eddy in the space formed at the interior-angle side of the pump mount base 60 to thereby cool the motor drivers 17 and 18.

The pump mount base 60 is made of metal, such as aluminum, titanium, stainless steel, and is formed from a single block of material. This pump mount base 60 is preferably made of a material with a high corrosion resistance. In a case where the pump mount base 60 is made of a material having a low heat conductivity, such as stainless steel, the pump mount base 60 can interrupt heat transfer between the above electrical devices (e.g., the motor drivers 17 and 18, and the DC power supply 19) and the vacuum pumps 15 and 16. On the other hand, in a case where the pump mound base 60 is made of a material having a high heat conductivity, such as aluminum or titanium, the pump mount base 60 can serve as a heat sink to radiate heat.

Figure 10:
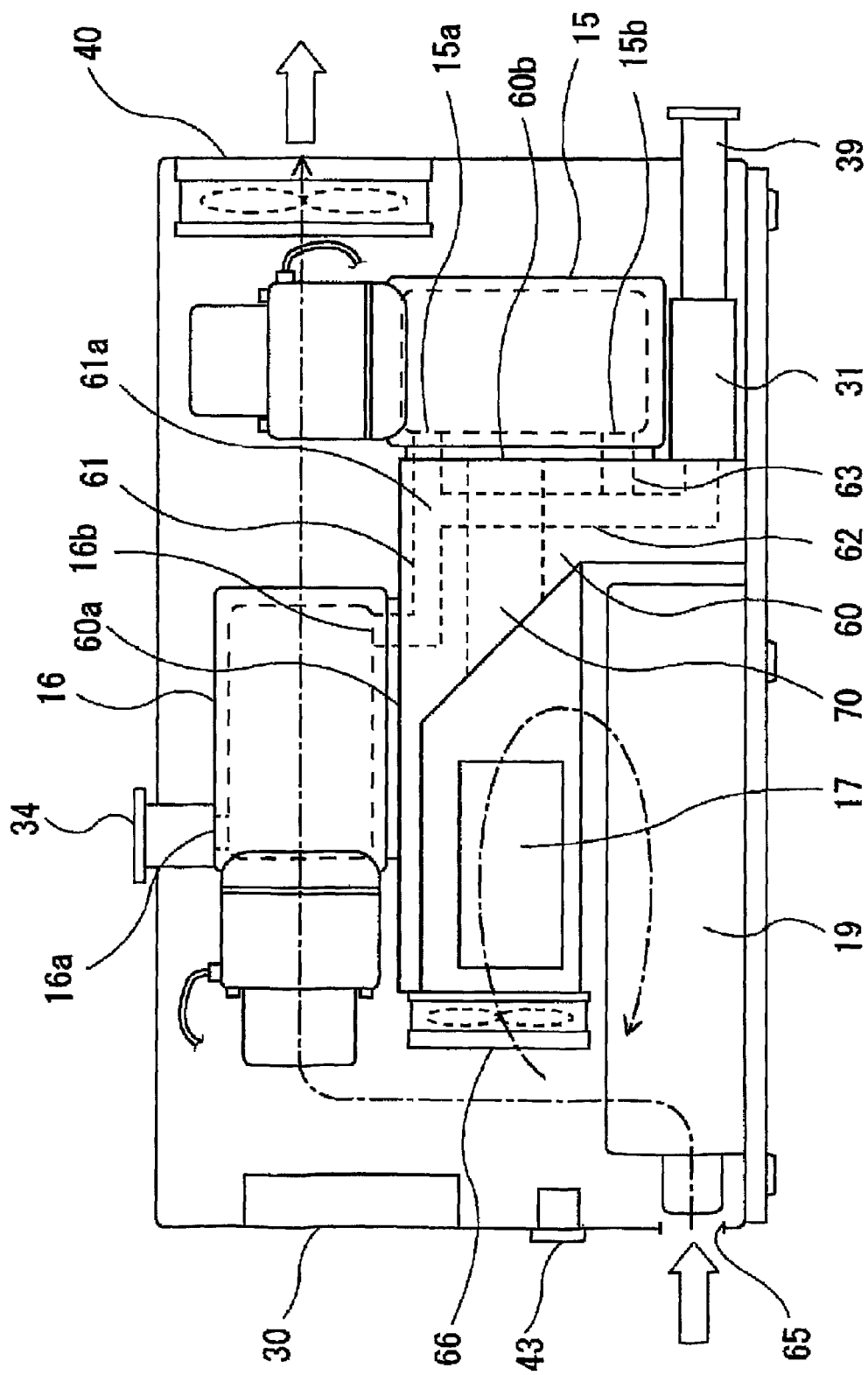
FIG. 10 is a side view showing another example of the vacuum pump unit shown in FIG. 7.

FIG. 10 is a side view showing another structural example of the vacuum pump unit shown in FIG. 7. In this example shown in FIG. 10, an auxiliary cooling fan 66 is mounted on a side portion of the pump mount base 60. This auxiliary cooling fan 66 is located beside the motor drivers 17 and 18, and distributes the air, which was introduced through the ventilating hole 65, to the motor drivers 17 and 18 to cool them. One or more through-hole 70 is formed in the pump mount base 60 at a position so as not to exert any influence on the communication passage 61, the pressure release passage 62, and the discharge passage 63. The through-hole 70 is located at substantially the same height as the auxiliary cooling fan 66 and the motor drivers 17 and 18, so that the air, supplied by the auxiliary cooling fan 66, passes through the through-hole 70 to reach the main pump 15.

With these arrangements, the air is forced to swirl near the motor drivers 17 and 18. Further, because the air passes through the through-hole 70 to blow against the main pump 15, this main pump 15 can be cooled more effectively.

Figure 11:
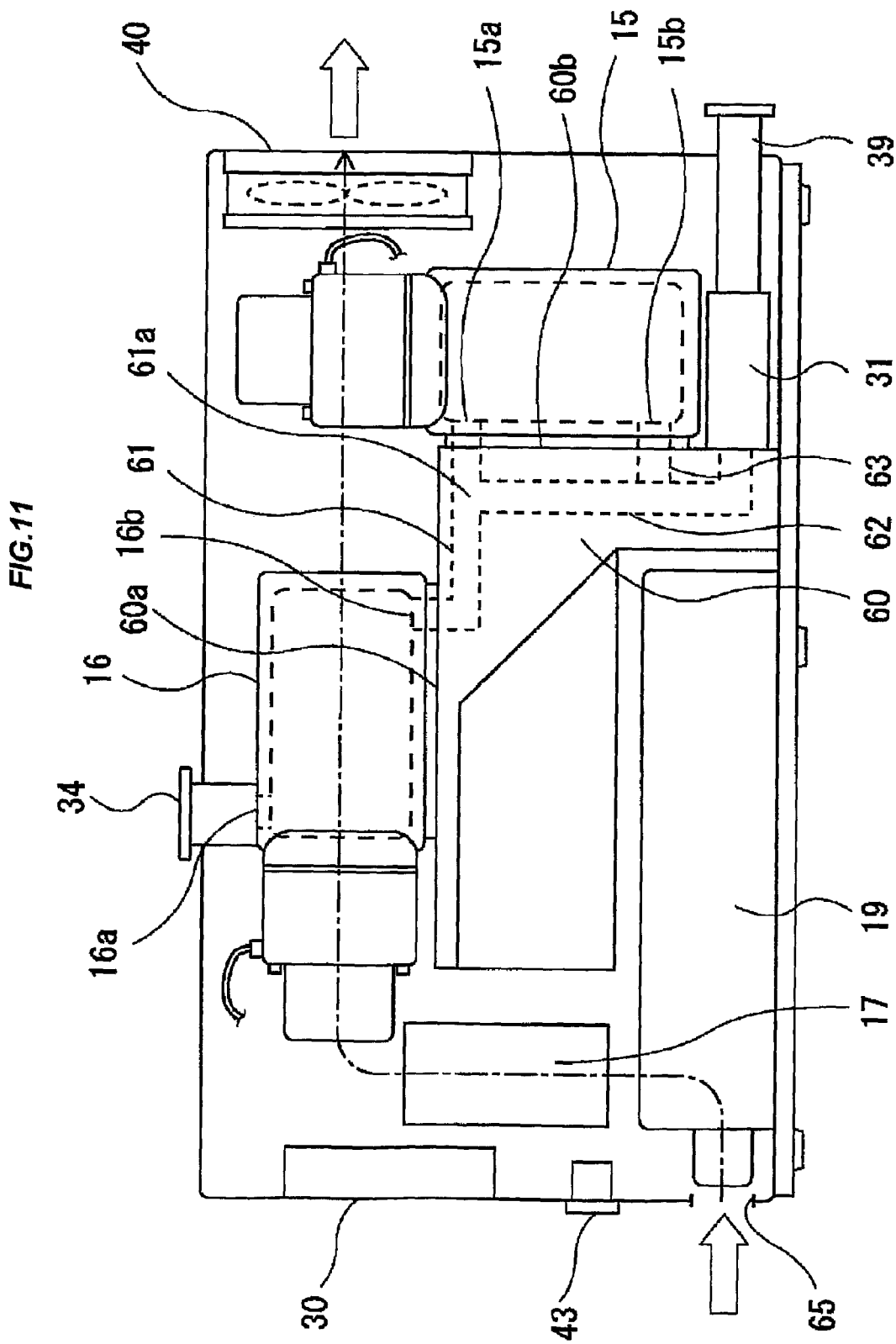
FIG. 11 is a side view showing another example of the vacuum pump unit shown in FIG. 7.

FIG. 11 is a side view showing another structural example of the vacuum pump unit shown in FIG. 7. In this example shown in FIG. 11, the motor drivers 17 and 18 are arranged in parallel on a main stream of the air produced by the operation of the cooling fan 40 (only the motor driver 17 is shown in FIG. 11). More specifically, the motor drivers 17 and 18 are located above the DC power supply 19 and beside the pump mount base 60. These arrangements of the motor drivers 17 and 18 on the mainstream of the air result in the same cooling effect as that of the example shown in FIG. 10, while allowing the vacuum pump unit to have a simple structure as a whole.

Figure 12A:
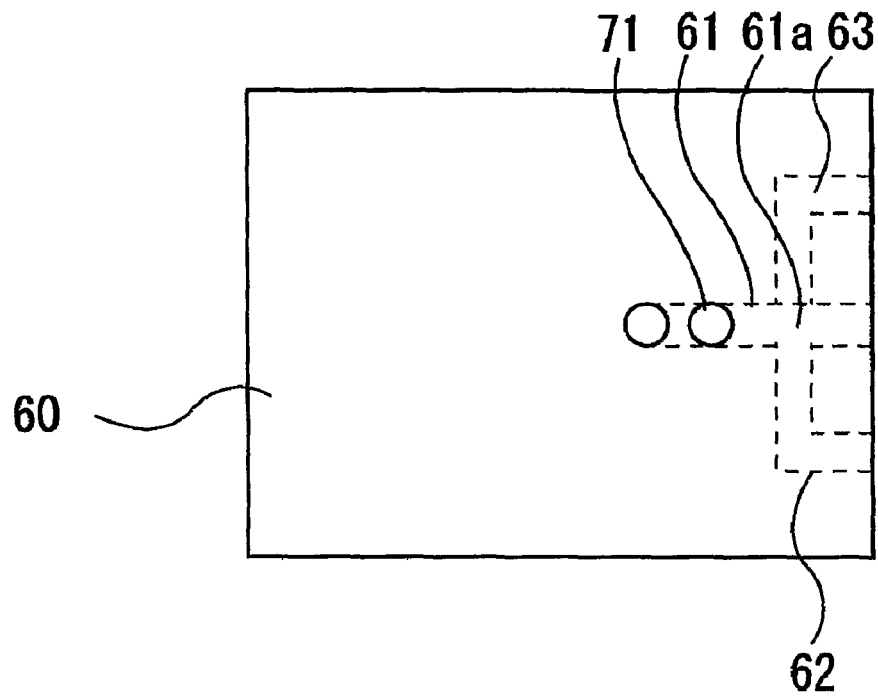
FIG. 12A is a plan view showing another example of the pump mount base.
Figure 12B:
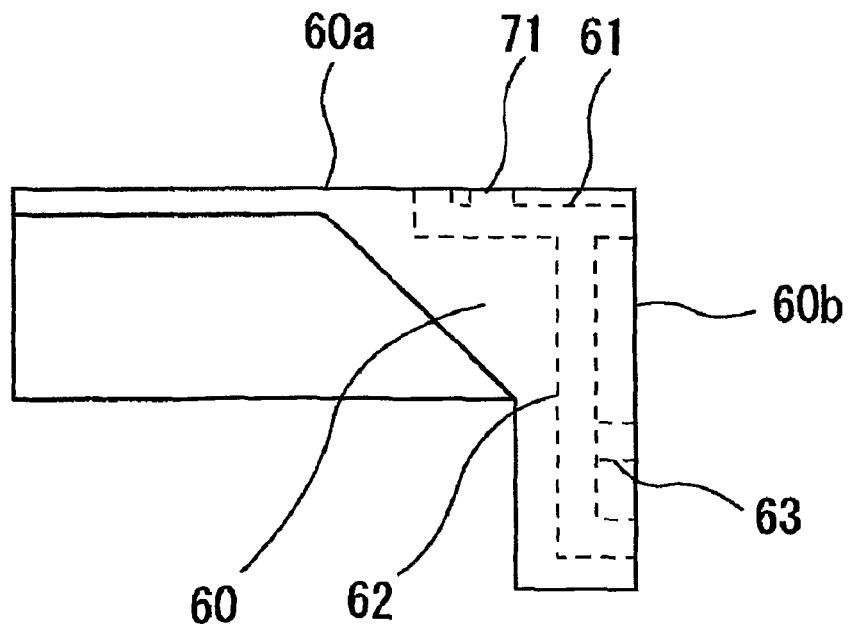
FIG. 12B is a side view of FIG. 12A.

FIG. 12A is a plan view showing another structural example of the pump amount base, and FIG. 12B is a side view of FIG. 12A. In this example, a bypass passage 71, which is in fluid communication with the communication passage 61, is formed in the pump mount base 60. This bypass passage 71 is usually clogged with a non-illustrated closing member. In a case where low vacuum (for example, at most 5000 Pa) is required for the vacuum chamber, the closing member is removed and the bypass passage 71 is coupled to the vacuum chamber. Then, the vacuum pump unit is operated to evacuate the vacuum chamber with the booster pump 16 bypassed. During this operation, it is preferable to close the passage of the booster pump 16 with a non-illustrated valve connected to the inlet pipe 34 or with a closing member covering an inlet of the communication passage 61 (i.e., an opening connected to the outlet port 16b of the booster pump 16). An additional vacuum chamber, which requires high vacuum (for example, at most 1 Pa), may be coupled to the inlet pipe 34 so that two vacuum chambers can be evacuated simultaneously.

Figure 13:
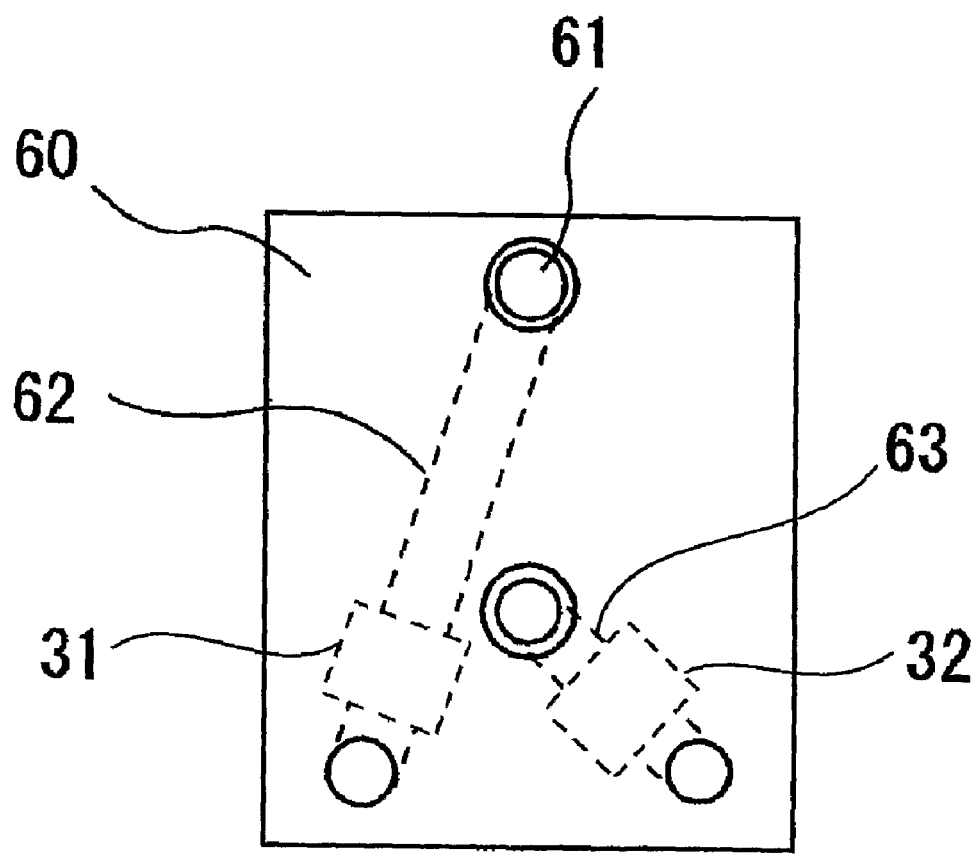
FIG. 13 is a view showing an example in which pressure release valves are installed in the pump mount base.

FIG. 13 is a view showing a structural example in which the pressure release valves 31 and 32 are installed in the pump mount base 60. As shown in FIG. 13, the pressure release valve 31 is provided in the pressure release passage 62, and the pressure release valve 32 is provided in the discharge passage 63. In this example, the pump mount base 60 can provide the communication passage 61, the pressure release passage 62, the discharge passage 63, and the base of the main pump 15 and the booster pump 16, and incorporates the pressure release valves 31 and 32 therein. Therefore, the whole structure of the vacuum pump unit can be compact, and a production cost can be lowered. Further, this embodiment can help to facilitate piping operations and to avoid misconnecting of pipes and valves. The check valve 33 may be disposed in the discharge passage 63 at a position downstream of the pressure release valve 32.

Although the above-described embodiments use the screw-type vacuum pump, it is noted that the present invention can be applied to other types of positive displacement two-axis vacuum pump, such as Roots-type vacuum pump.

The previous description of embodiments is provided to enable a person skilled in the art to make and use the present invention. Moreover, various modifications to these embodiments will be readily apparent to those skilled in the art. Therefore, the present invention is not intended to be limited to the embodiments described herein but is to be accorded the technical concept thereof.

INDUSTRIAL APPLICABILITY

The present invention is applicable to a dry vacuum pump unit capable of achieving ultimate pressure of about 1 Pa.

The invention claimed is:

1. A vacuum pump unit comprising:
a main pump disposed at an outside-pressure side;
a booster pump disposed at a vacuum side; and
a pump mount base having a substantially horizontal upper surface and a substantially vertical side surface,
wherein said booster pump and said main pump are coupled in series,
wherein said booster pump has a higher pumping speed than that of said main pump,
wherein each of said main pump and said booster pump includes:
a pair of pump rotors;
a casing having an inlet port and an outlet port; and
a pair of magnet rotors rotatable with said pair of pump rotors,
wherein a communication passage is formed in said pump mount base for providing fluid communication between said outlet port of said booster pump and said inlet port of said main pump, and
wherein said booster pump is mounted on said upper surface of said pump mount base, and
said main pump is mounted on said side surface of said pump mount base.

2. The vacuum pump unit as recited in claim 1, wherein said outlet port of said main pump is arranged at a lower end of a fluid passage formed in said casing of said main pump.

3. The vacuum pump unit as recited in claim 1, further comprising a first check valve coupled to said outlet port of said main pump for preventing a fluid from flowing back into said main pump, said first check valve being operable to be opened when pressure of the fluid flowing through said outlet port of said main pump becomes higher than an outside pressure.

4. The vacuum pump unit as recited in claim 3, further comprising a second check valve arranged downstream of said first check valve.

5. The vacuum pump unit as recited in claim 1, wherein said pair of pump rotors of said main pump comprises a pair of screw rotors.

6. The vacuum pump unit as recited in claim 1, wherein said pair of magnet rotors of said main pump are arranged above said pair of pump rotors of said main pump.

7. The vacuum pump unit as recited in claim 1, wherein:
said pair of pump rotors of said booster pump comprises a pair of screw rotors;
said inlet port of said booster pump is provided at an upper portion of said casing of said booster pump; and
said outlet port of said booster pump is provided at a lower portion of said casing of said booster pump.

8. The vacuum pump unit as recited in claim 1, wherein said pump mount base is formed from a single block of material.

9. The vacuum pump unit as recited in claim 1, wherein a discharge passage is formed in said pump mount base, and said discharge passage is coupled to said outlet port of said main pump.

10. The vacuum pump unit as recited in claim 9, wherein a check valve is provided in said discharge passage.

11. The vacuum pump unit as recited in claim 1, wherein:
said pump mount base has an inverted L-shaped cross section and is fixed to a bottom portion of said vacuum pump unit; and
electrical devices for driving said vacuum pump unit are arranged in a space formed at an interior-angle side of said pump mount base.

12. The vacuum pump unit as recited in claim 11, further comprising a cooling fan for cooling said main pump, said booster pump, and said electrical devices.

13. A vacuum pump unit comprising:
a main pump disposed at an outside-pressure side;
a booster pump disposed at a vacuum side; and
a pump mount base,
wherein said booster pump and said main pump are coupled in series,
wherein said booster pump has a higher pumping speed than that of said main pump,
wherein each of said main pump and said booster pump includes:
a pair of pump rotors;
a casing having an inlet port and an outlet port; and
a pair of magnet rotors rotatable with said pair of pump rotors,
wherein a communication passage is formed in said pump mount base for providing fluid communication between said outlet port of said booster pump and said inlet port of said main pump, and
wherein a pressure release passage, branching off from said communication passage, is formed in said pump mount base,
said pressure release passage is in fluid communication with an outlet pipe of said vacuum pump unit,
a pressure release valve is provided between said pressure release passage and said outlet pipe, and
said pressure release valve is operable to be opened when pressure of the fluid in said communication passage becomes higher than the outside pressure.

14. The vacuum pump unit as recited in claim 13, wherein
said pump mount base has a substantially horizontal upper surface and a substantially vertical side surface,
said booster pump is mounted on said upper surface of said pump mount base, and
said main pump is mounted on said side surface of said pump mount base.

15. A vacuum pump unit comprising:
a main pump disposed at an outside-pressure side;
a booster pump disposed at a vacuum side; and
a pump mount base,
wherein said booster pump and said main pump are coupled in series,
wherein said booster pump has a higher pumping speed than that of said main pump,
wherein each of said main pump and said booster pump includes:
a pair of pump rotors;
a casing having an inlet port and an outlet port; and
a pair of magnet rotors rotatable with said pair of pump rotors,
wherein a communication passage is formed in said pump mount base for providing fluid communication between said outlet port of said booster pump and said inlet port of said main pump, and
wherein a pressure release passage and a pressure release valve are provided in said pump mount base,
said pressure release passage branches off from said communication passage, and
said pressure release valve is operable to be opened when pressure of the fluid in said communication passage becomes higher than the outside pressure.

16. The vacuum pump unit as recited in claim 15, wherein
said pump mount base has a substantially horizontal upper surface and a substantially vertical side surface,
said booster pump is mounted on said upper surface of said pump mount base, and
said main pump is mounted on said side surface of said pump mount base.

17. A pump mount base for use in a vacuum pump unit having a main pump disposed at an outside-pressure side and a booster pump disposed at a vacuum side, said pump mount base comprising:
a communication passage formed therein for providing fluid communication between an outlet port of said booster pump and an inlet port of said main pump,
wherein a pressure release passage, branching off from said communication passage, is formed in said pump mount base,
a pressure release valve is provided in said pressure release passage, and
said pressure release valve is operable to be opened when pressure of a fluid in said communication passage becomes higher than an outside pressure,
further comprising a substantially horizontal upper surface and a substantially vertical side surface,
wherein said booster pump is mounted on said upper surface of said pump mount base, and
said main pump is mounted on said side surface of said pump mount base.

18. The pump mount base as recited in claim 17, wherein:
a discharge passage, to be coupled to an outlet port of said main pump, is formed in said pump mount base; and
a check valve is provided in said discharge passage.

19. The vacuum pump base as recited in claim 17, wherein said pump mount base has an inverted L-shaped cross section.

* * * * *